(12) United States Patent
Wang et al.

(10) Patent No.: US 11,828,843 B2
(45) Date of Patent: Nov. 28, 2023

(54) METHOD AND APPARATUS FOR EVENT DETECTION, ELECTRONIC DEVICE, AND STORAGE MEDIUM

(71) Applicant: BEIJING XIAOMI MOBILE SOFTWARE CO., LTD., Beijing (CN)

(72) Inventors: Kai Wang, Beijing (CN); Runyu Shi, Beijing (CN); Wei Lu, Beijing (CN); Chenchen Bao, Beijing (CN); Xudong Yin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 234 days.

(21) Appl. No.: 17/364,774

(22) Filed: Jun. 30, 2021

(65) Prior Publication Data
US 2022/0252722 A1   Aug. 11, 2022

(30) Foreign Application Priority Data

Feb. 8, 2021   (CN) .......................... 202110172631.1

(51) Int. Cl.
*G01S 15/04* (2006.01)
*G01S 15/10* (2006.01)
*G06N 20/00* (2019.01)

(52) U.S. Cl.
CPC ............ *G01S 15/04* (2013.01); *G01S 15/104* (2013.01); *G06N 20/00* (2019.01)

(58) Field of Classification Search
CPC ........ G01S 15/04; G01S 15/104; G01S 7/527; G01S 15/58; G06F 3/0416; G06F 3/04186; G06F 17/14; G06F 2218/12; G06F 2218/08; G06N 20/00; G06N 3/045
See application file for complete search history.

(56) References Cited

U.S. PATENT DOCUMENTS

| 6,987,707 | B2 * | 1/2006 | Feintuch ............ G08B 13/1618 367/87 |
| 2002/0034123 | A1 * | 3/2002 | Fuenfgeld ............. G01F 23/284 367/99 |
| 2011/0096954 | A1 | 4/2011 | Dahl |
| 2014/0177393 | A1 * | 6/2014 | Menne .................... B60Q 3/80 367/93 |

(Continued)

FOREIGN PATENT DOCUMENTS

| CN | 108845324 A | 11/2018 |
| CN | 110058243 A | 7/2019 |
| GB | 2558768 A | 7/2018 |

OTHER PUBLICATIONS

European Search Report in the European Application No. 21182407.3, dated Jan. 31, 2022, (11p).

*Primary Examiner* — Ojiako K Nwugo
(74) *Attorney, Agent, or Firm* — Arch & Lake LLP

(57) ABSTRACT

A method, apparatus, and a non-transitory computer-readable storage medium for event detection are provided. The method may be applied to an electronic device. The electronic device may transmit a detection signal. The electronic device may receive an echo signal of the detection signal. The electronic device may acquire a feature value of the echo signal. The electronic device may calculate a decision parameter based on the feature value, and may determine, based on the decision parameter, that the electronic device is moving towards or away from a target object.

17 Claims, 5 Drawing Sheets

(56) References Cited

U.S. PATENT DOCUMENTS

| | | | |
|---|---|---|---|
| 2014/0320390 A1 | 10/2014 | Dahl | |
| 2015/0301611 A1 | 10/2015 | Dahl | |
| 2019/0050061 A1 | 2/2019 | Borstad et al. | |
| 2019/0317191 A1* | 10/2019 | Santra | G01S 13/881 |
| 2021/0011121 A1* | 1/2021 | Arbabian | G01S 7/411 |
| 2021/0073545 A1* | 3/2021 | Buchaca | G06V 10/82 |

* cited by examiner feature values recognition result

METHOD AND APPARATUS FOR EVENT DETECTION, ELECTRONIC DEVICE, AND STORAGE MEDIUM

CROSS-REFERENCE TO RELATED APPLICATION

This application is based upon and claims priority to Chinese Patent Application No. 202110172631.1, filed on Feb. 8, 2021, the entire contents of which are incorporated herein by reference for all purposes.

TECHNICAL FIELD

The present disclosure relates to event detection techniques in electronic devices, and more particularly, to a method and apparatus for event detection, an electronic device, and a storage medium.

BACKGROUND

Currently, when a user is using a mobile device such as a mobile phone, particularly, when the user is on a call, the user places a receiver of the mobile phone or the like to be attached to an ear of the user. In this way, the screen of the mobile phone or the like may be attached to the face of the user accordingly. As a result, the screen of the mobile phone may be mistakenly touched, causing the current call to be hanged up automatically or held without any reason, which is inconvenient for the user to make and receive calls.

SUMMARY

The present disclosure provides a method and apparatus for event detection, an electronic device, and a storage medium.

According to a first aspect of the present disclosure, there is provided a method for event detection. The method may be applied to an electronic device. The electronic device may transmit a detection signal. The electronic device may receive an echo signal of the detection signal. The electronic device may acquire a feature value of the echo signal based on the echo signal. The electronic device may calculate a decision parameter based on the feature value, and determining, based on the decision parameter, that the electronic device is moving towards or away from a target object.

According to a second aspect of the present disclosure, there is provided an electronic device including one or more processors, a non-transitory computer-readable memory storing instructions executable by the one or more processors. The one or more processors may be configured to transmit a detection signal. The one or more processors may also be configured to receive an echo signal of the detection signal. The one or more processors may also be configured to acquire a feature value of the echo signal based on the echo signal. The one or more processors may also be configured to calculate a decision parameter based on the feature value. The one or more processors may also be configured to determine, based on the decision parameter, that the electronic device is moving towards or away from a target object.

According to a third aspect of the present disclosure, there is provided a non-transitory computer readable storage medium, wherein instructions in the storage medium, when executed by one or more processors of an electronic device, may cause the one or more processors to transmit a detection signal. The instructions may also cause the apparatus to receive an echo signal of the detection signal. The instructions may also cause the apparatus to acquire a feature value of the echo signal based on the echo signal. The instructions may also cause the apparatus to calculate a decision parameter based on the feature value, and determine, based on the decision parameter, that the electronic device is moving towards or away from a target object.

It is to be understood that the foregoing general description and the following detailed description are examples and explanatory only and are not restrictive of the disclosure.

BRIEF DESCRIPTION OF THE DRAWINGS

The accompanying drawings, which are incorporated herein and constitute a part of the specification, illustrate embodiments consistent with the present disclosure and, together with the description, serve to explain the principles of the disclosure.

DETAILED DESCRIPTION

Embodiments will be described in detail herein, examples of which are illustrated in the accompanying drawings. In the following description, when the drawings are referred to, the same numbers in different drawings indicate the same or similar elements unless otherwise indicated. The embodiments described in the following embodiments do not represent all embodiments consistent with the present disclosure. Rather, they are merely examples of devices and methods consistent with some aspects of the disclosure as detailed in the appended claims.

The method for event detection described in the embodiments of the present disclosure is applicable to electronic devices such as a mobile phone, an intelligent terminal, a game machine, a notebook computer, and a Pad.

Figure 1:
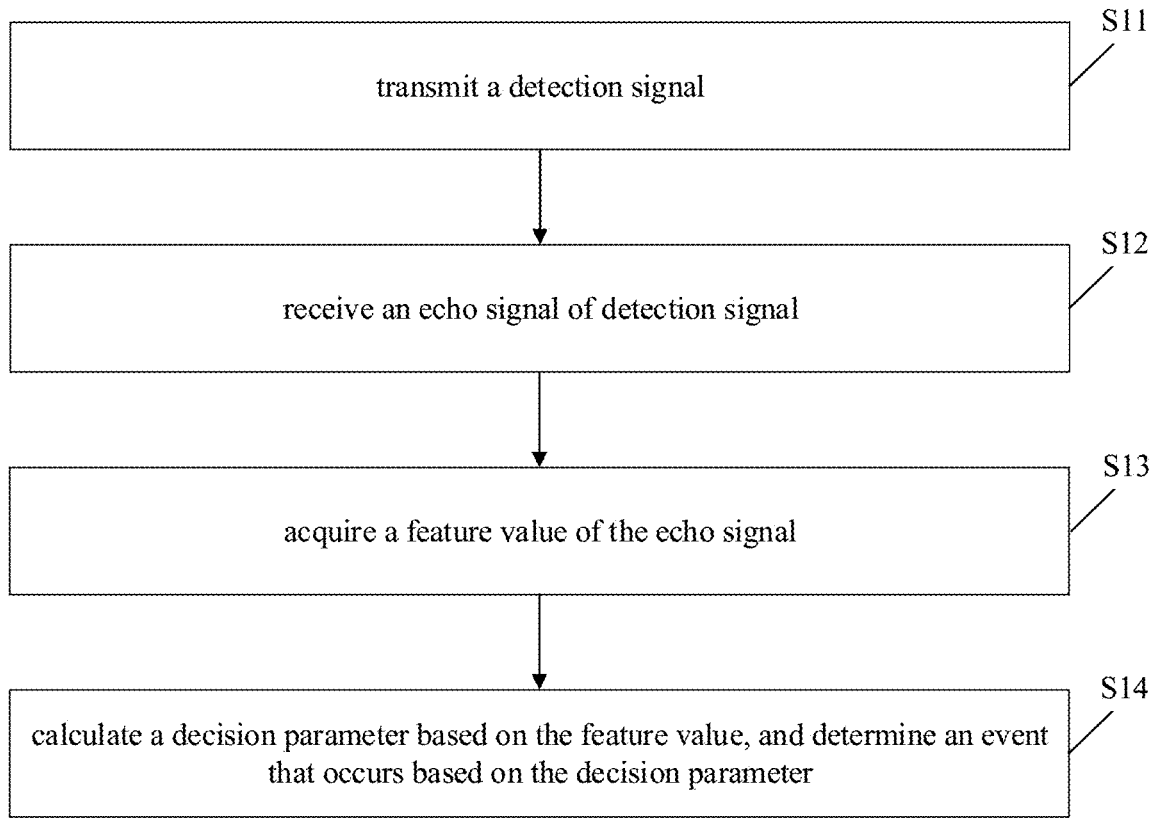
FIG. 1 is a schematic flowchart of a method for event detection, according to an example of the present disclosure.

FIG. 1 is a schematic flowchart of a method for event detection according to an embodiment of the present disclosure. As shown in FIG. 1, the method for event detection according to the embodiment of the present disclosure includes the following steps:

In S11, a detection signal is transmitted. For example, one or more detection signals are transmitted.

In one or more embodiments, two detection signals having a frequency greater than a set threshold value are transmitted. The frequencies of the two detection signals are different. Here, the setting threshold value may be 20000 Hz, and generally, a detection signal having a frequency greater than 20000 Hz is an ultrasonic signal. In the embodiment of the present disclosure, use of an ultrasonic signal can improve the accuracy of event detection.

In S12, an echo signal of detection signal is received. For example, for each of the one or more detection signals, an echo signal of detection signal is received; and accordingly, one or more echo signals, each corresponding a respective one of the one or more detection signals are received.

In one or more embodiments, echo detection is also performed on the transmitted one or more detection signals. For each of the detection signals, a reflected signal of the detection signal is received, and event detection is performed based on the received echo signal.

In S13, a feature value of the echo signal is acquired. For example, for each of the one or more echo signals, a feature value of the echo signal is acquired; and accordingly, one or more feature values, each corresponding to a respective one of the one or more echo signals are acquired.

In one or more embodiments, the operation of acquiring a feature value of the echo signal includes:

performing frequency shift on the echo signal, and performing low-pass filtering on the frequency-shifted echo signal; obtaining frequency components of the echo signal by performing frequency domain transform on the low-pass filtered echo signal; calculating amplitudes of a center frequency component and a predetermined number of frequency components surrounding the center frequency component, and forming a feature vector with the calculated amplitudes to form a frequency shift spectrum, the frequency shift spectrum being taken as a feature value of the echo signal, wherein a frequency component corresponding to a frequency of the detection signal is taken as the center frequency component.

Before the frequency domain transform is performed on the low-pass filtered echo signal, the low-pass filtered echo signal may be subjected to downsampling to reduce a sampling rate of the low-pass filtered echo signal. By reducing the sampling rate of the echo signal, the efficiency of determining the feature value of the echo signal can be improved.

In one or more embodiments, the operation of performing frequency domain transform on the low-pass filtered echo signal includes: framing the low-pass filtered echo signal based on a set duration, and windowing the framed echo signal by multiplying the framed echo signal with a window function; and obtaining frequency components of the echo signal by performing Fourier transform or discrete cosine transform on the windowed echo signal.

In S14, a decision parameter is calculated based on the feature value, and an event that occurs is determined based on the decision parameter. For example, for each of the one or more feature values, a decision parameter is calculated based on the feature value; and accordingly, one or more decision parameters are calculated, and an event that occurs is determined based on the decision parameters.

In the embodiments of the disclosure, a neural network may be used to determine whether an event occurs, a neural network model or a neural network model combination may be set and trained to generate model coefficients of each network layer in the neural network model or the neural network model combination, and a decision parameter may be generated based on a correlation of the feature value and the model coefficients. As an example, the neural network model may be composed of a n-layer convoluted neural network model (CNN) and a one-layer fully-connected composite neural network, or may be other types of neural network models or a combination of the neural network models. The coefficients of each layer of the neural network may be pre-trained model coefficients. The input feature value is calculated via the neural network to obtain a classification result, and thus obtaining a recognition result of an approaching/leaving the event. In the embodiments of the disclosure, the type of the neural network and the method of training the neural network are not limited, and those skilled in the art shall understand that it is easy to determine whether an event to be detected occurs through extensive training of the correlation between the feature value and the approaching/leaving event.

In one or more embodiments, as another implementation, it may be:

assumed that the frequencies of the two detection signals are $f_1$ and $f_2$, where $f_2 > f_1$, and two threshold value $T_1$ and $T_2$ are set;

among the feature values of the echo signal, a ratio $r_1$ of a root-mean-square value or a mean value of amplitudes of the echo signal in a frequency band of $f_{11}$ to $f_{12}$, which is lower than $f_1$, to an amplitude of the echo signal at the frequency $f_1$ is calculated; a ratio $r_2$ of a root-mean-square value or a mean value of amplitudes of the echo signal in a frequency band of $f_{21}$ to $f_{22}$, which is higher than $f_2$, to an amplitude of the echo signal at the frequency $f_2$ is calculated; and if $r_1 > T_1$, a leaving event occurs; if $r_2 > T_2$, an approaching event occurs. Here, in the approaching event, the electronic device is moving towards a target object. In the leaving event, the electronic device is moving away from the target object.

When the electronic device detects that an approaching event occurs, that is, when the electronic device and an obstacle, such as a human face, becomes close to each other, the touch response of the touch screen of the electronic device may be turned off, so as to prevent a user from mistakenly touching the display screen that may be caused when the user is receiving a call. In the embodiments of the present disclosure, the approaching event may also be combined with the current service to limit the touch response of the touch screen. For example, when the electronic device is on a call, a video live broadcast, or a video call, it is detected whether the approaching event occurs, and the touch response of the touch screen is limited. Similarly, when the electronic device detects that a remote event occurs, the touch control response limit for the touch screen of the electronic device can be relieved.

The essence of the technical improvements of the disclosed embodiments is further illustrated by specific examples.

In the embodiments of the disclosure, a sound generating device and a sound receiving device are provided in an electronic device, the sound generating device transmits ultrasonic signals having two different frequencies, receives ultrasonic signals from the air through the sound receiving device, and determines an event that the device is approaching/leaving an obstacle by analyzing time-frequency characteristics of the ultrasonic signals. The frequency shift spectra of the ultrasonic echo signals are calculated to represent the difference when the electronic device such as a mobile phone is moving towards or away from an obstacle, and the frequency shift characteristics are used as an input of the neural network model to perform state recognition. The embodiments of the disclosure may utilize the neural network for event detection when detecting an event of approaching/leaving an obstacle.

Figure 2:
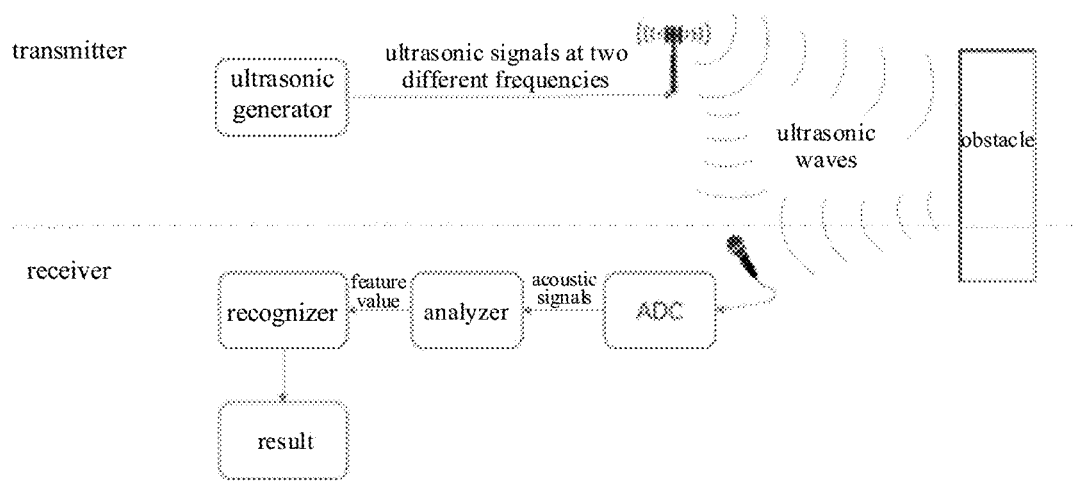
FIG. 2 is a schematic diagram of a method for event detection, according to an example of the present disclosure.

FIG. 2 is a schematic diagram of a method for event detection according to an embodiment of the present disclosure. As shown in FIG. 2, an ultrasonic generator, an acoustic receiver, an analyzer, and a recognizer are included in an electronic device according to the embodiment of the present disclosure. A band-pass ultrasonic signal is generated by an ultrasonic generator and transmitted by an acoustic transmitter such as a horn, and then an ultrasonic echo signal transmitted from air is received by an acoustic receiver such as a microphone, etc. The received ultrasonic echo signal is analyzed by the analyzer, the feature values corresponding to the ultrasonic echo signal is extracted, and an event that the electronic device is approaching/leaving an obstacle is recognized by the recognizer based on the feature values extracted by the analyzer.

Figure 3:
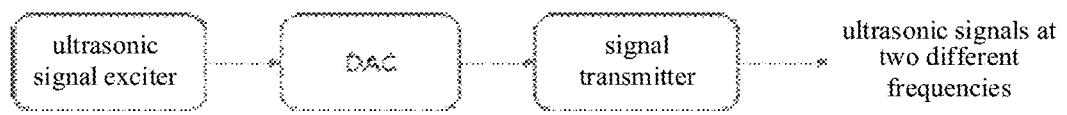
FIG. 3 is a schematic structural diagram of an ultrasonic generator, according to an example of the present disclosure.

FIG. 3 is a schematic diagram showing a structure of an ultrasonic generator according to an embodiment of the present disclosure. As shown in FIG. 3, the ultrasonic generator according to the embodiment of the present disclosure includes a signal exciter, an digital-to-analog (DAC) converter, a signal transmitter, and the like. The signal transmitter includes a horn, an earpiece, an ultrasonic transmitter, and the like. The ultrasonic signal exciter includes an exciter and a filter. Band-pass ultrasonic signals are generated by the ultrasonic signal exciter, and are transmitted to the outside by the signal transmitter after being converted into analog signals through the DAC converter.

Figure 4:
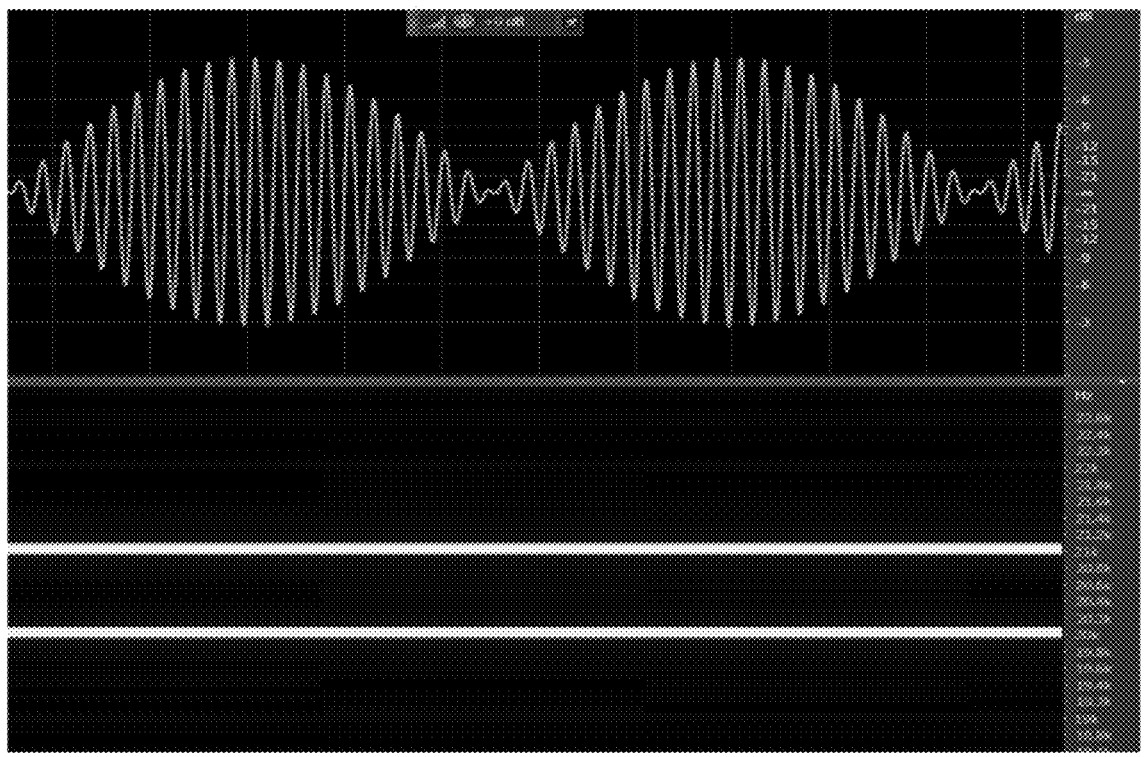
FIG. 4 is a schematic diagram of two ultrasonic signals transmitted by a signal transmitter, according to an example of the present disclosure.

FIG. 4 is a schematic diagram of two types of ultrasonic signals transmitted by a signal transmitter according to an embodiment of the present disclosure. As shown in FIG. 4, the upper half of the waveform pattern is a time domain waveform of the transmitted signal, and the lower half of the waveform pattern is a spectrum diagram of the transmitted signal.

Figure 5:
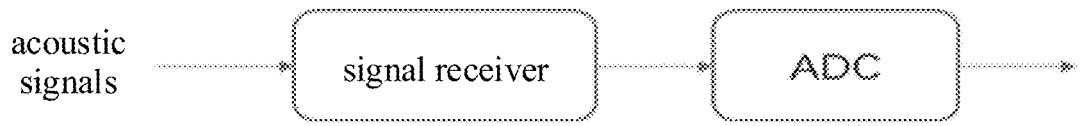
FIG. 5 is a schematic structural diagram of an acoustic wave receiver, according to an example of the present disclosure.

FIG. 5 is a schematic structural diagram of an acoustic wave receiver according to an embodiment of the present disclosure. As shown in FIG. 5, the acoustic wave receiver according to the embodiment of the present disclosure includes a signal receiver such as a microphone and a digital-to-analog (DAC) converter. After the signal receiver receives the acoustic signal, the DAC converter converts the received acoustic signal to a digital signal, and then input the digital signal to the analyzer of the embodiment of the present disclosure for analysis, to determine whether an event of approaching/leaving an obstacle occurs.

Figure 6:
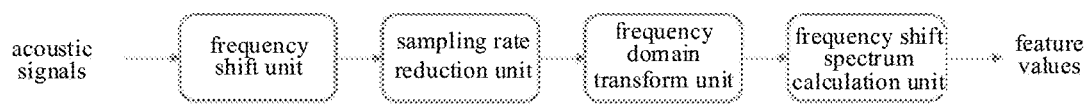
FIG. 6 is a schematic diagram showing a structure of an analyzer, according to an example of the present disclosure.

FIG. 6 is a schematic structural diagram of an analyzer according to an embodiment of the present disclosure. As shown in FIG. 6, the analyzer according to the embodiment of the present disclosure includes a frequency shift unit, a sampling rate reduction unit, a frequency domain transform unit, a feature value calculation unit, and a feature value combination unit.

The frequency shift unit performs frequency shift on the received echo signal W to shift the center frequency of the echo signal of the ultrasonic signal to zero, and then performs low-pass filtering to extract the acoustic signal in the desired frequency band for subsequent processing, to obtain the shifted acoustic signal Wshift. The calculation formula of the frequency shift is as follows:

$$b=2\times pi\times(f0-ft)\times r/fs, r=0,1,2,\ldots$$

$$W\text{shift}=W\times\exp(-i\times b)$$

Where f0 is the original frequency, ft is the target frequency, b is the phase value of the echo signal, and exp is an exponential function based on the natural constant e.

Where exp(−i×b) is transformed by the Euler formula to:

$$\text{Exp}(-i\times\theta)=\cos(-\theta)+i\times\sin(-\theta)=\cos\theta-i\times\sin\theta$$

It is found that when the target frequency spectrum is determined, the calculation result of the trigonometric function in the above formula is periodic, and thus the trigonometric function values of one period can be stored, to obtain the trigonometric function values corresponding to the phases of the acoustic wave, and the shifted acoustic wave signal, thereby reducing the power consumption for the processing.

After the processing of the frequency shift unit, the acoustic signal frequency is distributed in a lower frequency band, and then the ultrasonic signal Wshift is transmitted to the sampling rate reduction unit for downsampling to obtain the sampled acoustic signal Wdown, so as to reduce the data amount and simplify the calculation.

The frequency domain transform unit performs frequency domain transform on the downsampled acoustic wave signal Wdown, to obtain the frequency components of the signal for calculation by the feature value calculation unit. First, framing and windowing operations are performed on the signal Wdown, where the framing is framing an object to be processed based on a set duration, where the set duration may be 10 ms, 20 ms, or the like, and the windowing is performed on the framed echo signal by multiplying the window function. In the embodiments of the present disclosure, the framing is performed so as to ensure short-term performance of the processed data, and the windowing is performed so as to reduce leakage of the spectral energy. In the embodiments of the present disclosure, window functions such as a black-Harris window, a triangular window, a Hamming window, and the like may be used. Thereafter, a frequency domain transform may be performed using a Fast Fourier Transform (FFT), a Discrete Cosine Transform (DCT), or the like, and the transformed signal is F. Here, it is assumed that the frequency domain resolution after the frequency domain transform is n (n-point FFT), that is, for each frame, the F includes n frequency components F(1) . . . F(n).

The frequency shift spectrum calculation unit calculates the amplitudes of the two frequency components corresponding to each frame of the audio data ultrasonic transmission signal and the m frequency components adjacent to each frame of the audio data ultrasonic transmission signal to form a frequency shift spectrum, which is specifically calculated as follows:

The amplitude of each frequency component is calculated as follows:

$$F_p(k)=|F(k)|=\sqrt{(re(k)^2+im(k)^2)}$$

Where k denotes the k-th frequency component in the result of the frequency domain transform, re(k) denotes the real part of the frequency component, and im(k) denotes the imaginary part of the frequency component.

According to the above calculation method, amplitudes corresponding to a total of 2m+2 frequency components are acquired to form a (2m+2)-dimensional feature vector, and a frequency shift spectrum is formed by using the feature vector calculated from the audio data of the consecutive L frames, and used the frequency as an input of a subsequent recognizer, to recognize an event of moving towards or away from an obstacle.

When the device is approaching the obstacle, the frequency of the received signal shifts in the high frequency direction, and when the device is leaving the obstacle, the frequency of the received signal shifts in the low frequency direction. Therefore, this characteristic enables recognizing events that the device is approaching/leaving the obstacle.

Figure 7:
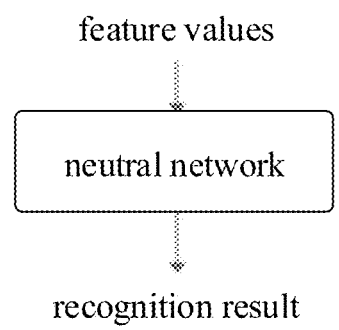
FIG. 7 is a schematic structural diagram of a recognizer, according to an example of the present disclosure.

FIG. 7 is a schematic structural diagram of a recognizer of an embodiment of the present disclosure. As shown in FIG. 7, the recognizer of the embodiment of the present disclosure may be a neural network. the neural network model may be composed of a n-layer convoluted neural network model (CNN) and a one-layer fully-connected composite neural network, or may be other types of neural network models or a combination of the neural network models. The coefficients of each layer of the neural network may be pre-trained model coefficients. The input feature value is calculated via the neural network to obtain a classification result, and thus obtaining a recognition result of an approaching/leaving the event.

The recognizer may also be a calculation decision unit that obtains a final result of event recognition by using the frequency shift characteristic calculated by the analyzer and in combination with a judgment manner such as threshold value judgment. The specific manner is as follows.

Assumed that the frequencies of the two detection signals are $f_1$ and $f_2$, where $f_2 > f_1$, and two threshold value $T_1$ and $T_2$ are set;

A mean square root value of amplitudes of ultrasonic signals in a frequency band of $f_{11}$ to $f_{12}$, which is lower than $f_1$, or a ratio $r_1$ of the mean value of amplitudes of ultrasonic signals in the frequency band of $f_{11}$ to $f_{12}$ to the amplitude of the ultrasonic signal at the frequency $f_1$ Mean Approach:

$$r_1 = \frac{\sum_{k=f_{11}}^{f_{12}} F(k)}{F(f_1) \Box (f_{12} - f_{11} + 1)}$$

Where F(•) represents the amplitude of the corresponding ultrasound signal at the corresponding frequency;

Root Mean Square Approach:

$$r_1 = \frac{\sqrt{\frac{\sum_{k=f_{11}}^{f_{12}} F^2(k)}{(f_{12} - f_{11} + 1)}}}{F(f_1)}$$

If $r_1 > T_1$, there is a leaving event that occurs; otherwise, no leaving events occurs.

A mean square root value of amplitudes of ultrasonic signals in a frequency band of $f_{21}$ to $f_{22}$, which is higher than $f_2$ or a ratio $r_2$ of the mean value of amplitudes of ultrasonic signals in the frequency band of $f_{21}$ to $f_{22}$ to the amplitude of the ultrasonic signal at the frequency $f_2$.

Mean Method:

$$r_2 = \frac{\sum_{k=f_{21}}^{f_{22}} F(k)}{F(f_2) \Box (f_{22} - f_{21} + 1)}$$

Where F(□) represents the amplitude of the corresponding ultrasound signal at the corresponding frequency;

Root Mean Square Method:

$$r_2 = \frac{\sqrt{\frac{\sum_{k=f_{21}}^{f_{22}} F^2(k)}{(f_{22} - f_{21} + 1)}}}{F(f_2)}$$

If $r_2 > T_2$, there is an approaching event that occurs; otherwise no approaching events occurs.

According to the embodiment of the present disclosure, detection signals at two different frequency bands are transmitted, the receiver receives echo signals of two detection signals, and forms frequency shift spectra by extracting frequency spectrum information around a specific frequency band of the two echo signals. When the frequency shift spectra approach/leave a mobile terminal device such as a mobile phone or the like, an obvious stripe appears. The present disclosure improves the effect of recognizing an approaching/leaving event by effectively utilizing the frequency shift information. According to the embodiment of the present disclosure, by detecting an approaching/leaving event between an electronic device and a user face, a corresponding touch response control can be performed on a screen of the electronic device based on the detection event. When the electronic device is approaching a face, the touch response of the screen of the electronic device is temporarily turned off, so that services such as answering a call by a user are not affected, and user experience is improved.

Figure 8:
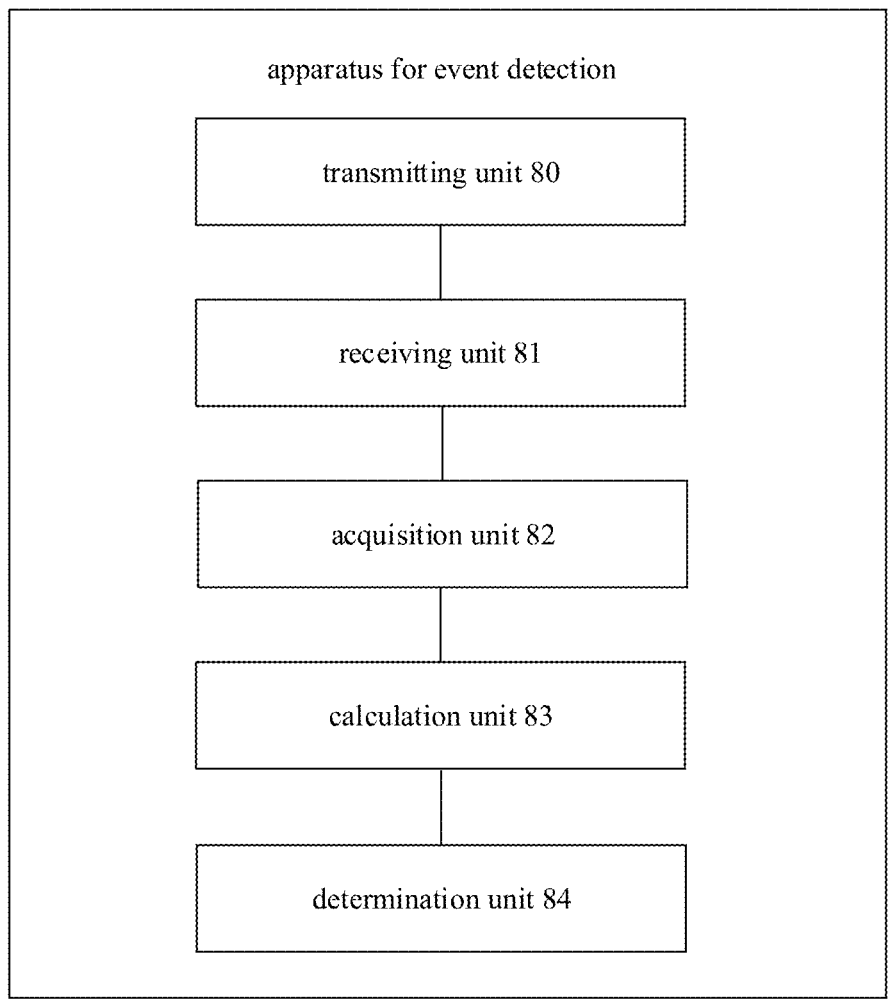
FIG. 8 is a schematic structural diagram of an apparatus for event detection, according to an example of the present disclosure.

FIG. 8 is a schematic structural diagram of an apparatus for event detection according to an embodiment of the present disclosure. As shown in FIG. 8, the apparatus for event detection according to the embodiment of the present disclosure includes a transmitting unit 80, a receiving unit 81, an acquisition unit 82, a calculation unit 83, and a determination unit 84.

The transmitting unit 80 is configured to transmit a detection signal.

The receiving unit 81 is configured to receive an echo signal of the detection signal;

The acquisition unit 82 is configured to acquire a feature value of the echo signal.

The calculation unit 83 is configured to calculate a decision parameter based on the feature value.

The determination unit 84 is configured to determine an event that occurs based on the decision parameter.

Optionally, the transmitting unit 80 is further configured to:

transmit two detection signals, each having a frequency greater than a set threshold value; the frequencies of the two detection signals are different from each other.

Optionally, the acquisition unit 82 is further configured to:

perform frequency shift on the echo signal, and perform low-pass filtering on the frequency-shifted echo signal;

obtain frequency components of the echo signal by performing frequency domain transform on the low-pass filtered echo signal; and calculate amplitudes of a center frequency component and a predetermined number of frequency components surrounding the center frequency component, and forming a feature vector with the calculated amplitudes to form a frequency shift spectrum, the frequency shift spectrum being taken as a feature value of the echo signal, wherein a frequency component corresponding to a frequency of the detection signal is taken as the center frequency component.

Optionally, the acquisition unit 82 is further configured to, before performing frequency domain transform on the low-pass filtered echo signal, reduce a sampling rate of the low-pass filtered echo signal by performing downsampling on the low-pass filtered echo signal.

Optionally, the acquisition unit 82 is further configured to:
frame the low-pass filtered echo signal based on a set duration, and multiply the framed echo signal by a window function to window the framed echo signal; and
obtain the frequency components of the echo signal by performing Fourier transform or discrete cosine transform on the windowed echo signal.

Optionally, the calculation unit 83 is further configured to:
generate model coefficients of various network layers in the neural network model or the neural network model combination by setting and training a neural network model or a neural network model combination, and generate the decision parameter based on a correlation of the feature value and the model coefficients.

Optionally, the calculation unit 83 is further configured to:
set two threshold value $T_1$ and $T_2$, wherein the frequencies of the two detection signals are $f_1$ and $f_2$, and $f_2 > f_1$;
among the feature values of the echo signal, calculate a ratio $r_1$ of a root-mean-square value or a mean value of amplitudes of the echo signal in a frequency band of $f_{11}$ to $f_{12}$, which is lower than $f_1$, to an amplitude of the echo signal at the frequency $f_1$, and calculate a ratio $r_2$ of a root-mean-square value or a mean value of amplitudes of the echo signal in a frequency band of $f_{21}$ to $f_{22}$, which is higher than $f_2$, to an amplitude of the echo signal at the frequency $f_2$; and
determine that a leaving event occurs in response to $r_1 > T_1$, or determining that an approaching event occurs in response to $r_2 > T_2$.

In one or more embodiments, the transmitting unit 80, the receiving unit 81, the obtaining unit 82, the calculating unit 83, the determining unit 84, and the like may be implemented by one or more central processing units (CPU, Central Processing Unit), a graphics processing unit (GPU, Graphics Processing Unit), a baseband processing unit (BP, Base Processor), an application specific integrated circuit (ASIC, Application Specific Integrated Circuit), a digital signal processing unit (Digital Signal Processor, DSP), a programmable logic device (PLD, Programmable Logic Device), a complex programmable logic device (CPLD, Complex Programmable Logic Device), a field programmable gate array (FPGA, Field-Programmable Gate Array), a general purpose processor, a controller, a microcontroller unit (MCU), a microprocessor, or other electronic components, or may be implemented in conjunction with one or more radio frequency (RF) antennas for performing the communication method of the foregoing embodiments.

In the embodiments of the present disclosure, the specific manners in which the individual units in the display processing apparatus perform operations have been described in detail in connection with embodiments of the methods, and will not be described in detail herein.

Figure 9:
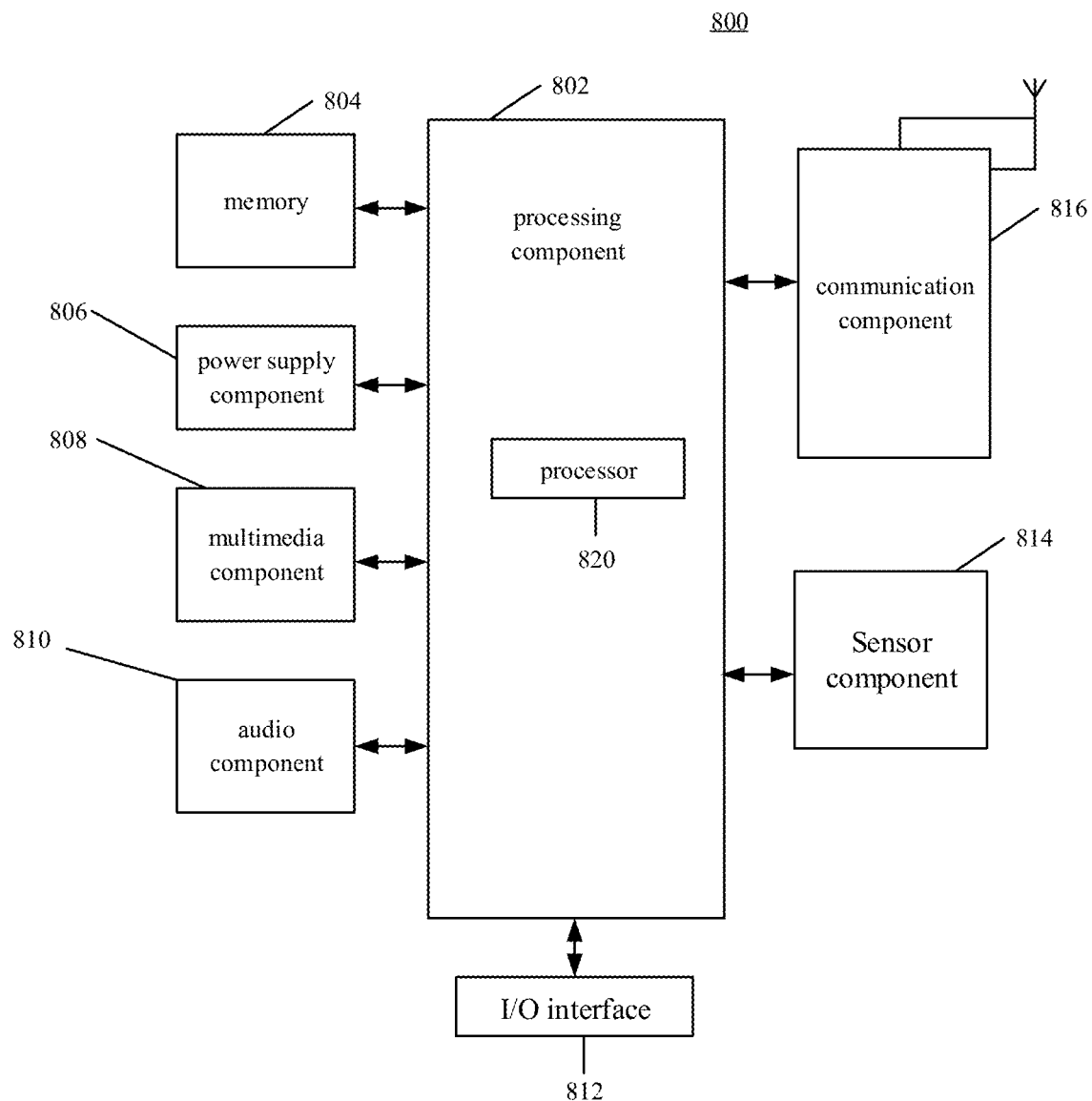
FIG. 9 is a block diagram of an electronic device, according to an example embodiment.

FIG. 9 is a block diagram of an electronic device 800 according to an embodiment. As shown in FIG. 9, the electronic device 800 supports multi-screen output, and may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operation of the electronic device 800, such as operations associated with displays, telephone calls, data communications, camera operations, and recording operations. The processing component 802 may include one or more processors 820 to execute instructions to perform all or a portion of the steps of the methods described above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the device 800. Examples of such data include instructions for any application or method operating on the electronic device 800, contact data, phone book data, messages, pictures, video, etc. The memory 804 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), read-only memory (ROM), a magnetic memory, a flash memory, a magnetic disk, or an optical disk.

The power supply component 806 supplies power for various components of the electronic device 800. The power component 806 may include a power management system, one or more power supplies, and other components associated with generating, managing, and distributing power for the electronic device 800.

The multimedia component 808 includes a screen for providing an output interface between the electronic device 800 and a user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, slides, and gestures on the touch panel. The touch sensor may not only sense the boundary of a touch or a sliding action, but also detect the duration and pressure associated with the touch or sliding operation. In some embodiments, the multimedia component 808 includes a front-facing camera and/or a rear-facing camera. The front-facing camera and/or the rear-facing camera may receive external multimedia data when the device 800 is in an operating mode, such as a shooting mode or a video mode. Each of the front-facing camera and the rear-facing camera may be a fixed optical lens system or have a focal length and optical zoom capability.

The audio component 810 is configured to output and/or input audio signals. For example, the audio component 810 includes a microphone (MIC) configured to receive an external audio signal when the electronic device 800 is in an operating mode, such as a call mode, a recording mode, and a speech recognition mode. The received audio signal may be further stored in the memory 804 or transmitted via the communication component 816. In some embodiments, the audio component 810 further includes a speaker for outputting an audio signal.

The I/O interface 812 provides an interface between the processing component 802 and a peripheral interface module, which may be a keyboard, a click wheel, a button, or the like. These buttons may include, but are not limited to, a home page button, a volume button, an activation button, and a lock button.

The sensor component 814 includes one or more sensors for providing state assessment of various aspects of the electronic device 800. For example, the sensor component 814 may detect an on/off state of the device 800, a relative positioning of a components, such as a display and keypad of the electronic device 800. The sensor component 814 may also detect a change in position of the electronic device 800 or of one of the components of the electronic device 800, the presence or absence of user contact with the electronic device 800, an orientation or acceleration/deceleration of the electronic device 800, and a change in temperature of the electronic device 800. The sensor component 814 may include a proximity sensor configured to detect the presence of a nearby object in the absence of any physical contact. The sensor component 814 may also include a light sensor, such as a Complementary Metal-Oxide-Semiconductor Transistor (CMOS) or Charge Coupled Device (CCD) image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between the electronic device 800 and other devices. The electronic device 800 may access a wireless network based on a communication standard, such as Wi-Fi, 2G or 3G, or a combination of these communication standards. In one or more embodiments, the communication component 816 receives broadcast signals or broadcast-related information from an external broadcast management system via a broadcast channel. In one or more embodiments, the communication component 816 further includes a near field communication (NFC) module to facilitate short-range communication. For example, the NFC module may be implemented based on the Radio Frequency Identification (RFID) technology, the Infrared Data Association (IrDA) technology, the Ultra Wideband (UWB) technology, the Bluetooth (BT) technology, and other technologies.

In one or more embodiments, electronic device 800 may be implemented by one or more application specific integrated circuits (ASICs), digital signal processors (DSPs), digital signal processing devices (DSPD), programmable logic devices (PLDs), field programmable gate arrays (FPGAs), controllers, microcontrollers, microprocessors, or other electronic components for performing the method for event detection of the above embodiments.

In one or more embodiments, there is further provided a non-transitory computer-readable storage medium including instructions, such as a memory 804 including instructions executable by the processor 820 of the electronic device 800 to perform the method for event detection of the above embodiments. For example, the non-transitory computer-readable storage medium may be a read only memory (ROM), a random access memory (RAM), a compact disc read only memory (CD-ROM), a magnetic tape, a floppy disk, an optical data storage device, or the like.

One or more embodiments further discloses a non-transitory computer readable storage medium, instructions in the storage medium, when executed by a processor of an electronic device, enable the electronic device to execute a control method, the method includes:
transmitting a detection signal;
receiving an echo signal of the detection signal;
acquiring a feature value of the echo signal; and
calculating a decision parameter based on the feature value, and determining an event that occurs based on the decision parameter.

In some embodiment of the present disclosure, detection signals at two different frequency bands are transmitted (here, the detection signals are preferably ultrasonic signals), so as to improve the accuracy of the event detection. The receiver receives echo signals of two detection signals, and forms frequency shift spectra by extracting frequency spectrum information around a specific frequency band of the two echo signals. When the frequency shift spectra approach/leave a mobile terminal device such as a mobile phone or the like, an obvious stripe appears. The present disclosure improves the effect of recognizing an approaching/leaving event by effectively utilizing the frequency shift information. According to the embodiment of the present disclosure, by detecting an approaching/leaving event between an electronic device and a user face, a corresponding touch response control can be performed on a screen of the electronic device based on the detection event. When the electronic device is approaching a face, the touch response of the screen of the electronic device is temporarily turned off, so that services such as answering a call by a user are not affected, and user experience is improved.

One or more embodiments further discloses a non-transitory computer readable storage medium, instructions in the storage medium, when executed by a processor of an electronic device, enable the electronic device to execute a control method, the method includes:
transmitting a detection signal;
receiving an echo signal of the detection signal;
acquiring a feature value of the echo signal; and
calculating a decision parameter based on the feature value, and determining an event that occurs based on the decision parameter.

Other embodiments of the present disclosure may be easily contemplated by those skilled in the art after considering the specification and practicing the present disclosure. This disclosure is intended to cover any variations, uses, or adaptations that follow the general principles of this disclosure and include common general knowledge or customary technical means in the art that are not disclosed in the disclosure. The specification and embodiments are regarded as examples only, and the true scope and spirit of the present disclosure is indicated by the appended claims.

It is to be understood that the present disclosure is not limited to the precise structures already described above and illustrated in the accompanying drawings, and that various modifications and changes may be made without departing from the scope thereof. The scope of the present disclosure is limited only by the appended claims.

What is claimed is:

1. A method for event detection, comprising:
transmitting a detection signal;
receiving an echo signal of the detection signal;
acquiring a feature value of the echo signal; and
calculating a decision parameter based on the feature value, and determining, based on the decision parameter, that an electronic device is moving towards or away from a target object, wherein acquiring the feature value of the echo signal comprises:
performing frequency shift on the echo signal, and performing low-pass filtering on the frequency-shifted echo signal;
obtaining frequency components of the echo signal by performing frequency domain transform on the low-pass filtered echo signal;
calculating amplitudes of a center frequency component and a predetermined number of frequency components surrounding the center frequency component; and forming a feature vector with the calculated amplitudes to form a frequency shift spectrum, wherein the frequency shift spectrum is a feature value of the echo signal, wherein a frequency component corresponding to a frequency of the detection signal is taken as the center frequency component.

2. The method of claim 1, wherein transmitting the detection signal comprises:
transmitting two detection signals, wherein each of the two detection signals have a frequency greater than a set threshold value, wherein the frequencies of the two detection signals are different from each other.

3. The method of claim 1, further comprising:
reducing a sampling rate of the low-pass filtered echo signal by performing downsampling on the low-pass filtered echo signal.

4. The method of claim 1, wherein performing frequency domain transform on the low-pass filtered echo signal comprises:
framing the low-pass filtered echo signal based on a set duration, and multiplying the framed echo signal by a window function to window the framed echo signal; and
obtaining the frequency components of the echo signal by performing Fourier transform or discrete cosine transform on the windowed echo signal.

5. The method of claim 2, wherein calculating the decision parameter based on the feature value comprises:
generating model coefficients of various network layers in a neural network model or a neural network model combination by setting and training the neural network model or the neural network model combination, and generating the decision parameter based on a correlation of the feature value and the model coefficients.

6. The method of claim 2, wherein calculating the decision parameter based on the feature value, and determining, based on the decision parameter, that the electronic device is moving towards or away from the target object comprises:
setting two threshold value $T_1$ and $T_2$, wherein the frequencies of the two detection signals are $f_1$ and $f_2$, and $f_2 > f_1$;
calculating, among the feature values of the echo signal, a ratio $r_1$ of a root-mean-square value or a mean value of amplitudes of the echo signal in a frequency band of $f_{11}$ to $f_{12}$, which is lower than $f_1$, to an amplitude of the echo signal at the frequency $f_1$, and calculating a ratio $r_2$ of a root-mean-square value or a mean value of amplitudes of the echo signal in a frequency band of $f_{21}$ to $f_{22}$, which is higher than $f_2$, to an amplitude of the echo signal at the frequency $f_2$; and
determining that a leaving event occurs in response to $r_1 > T_1$, or determining that an approaching event occurs in response to $r_2 > T_2$.

7. An electronic device, comprising:
one or more processors and
a non-transitory computer-readable storage medium storing instructions executable by the one or more processors, wherein the one or more processors are configured to:
transmit a detection signal;
receive an echo signal of the detection signal;
acquire a feature value of the echo signal;
calculate a decision parameter based on the feature value;
determine, based on the decision parameter, that the electronic device is moving towards or away from a target object;
perform frequency shift on the echo signal, and perform low-pass filtering on the frequency-shifted echo signal;
obtain frequency components of the echo signal by performing frequency domain transform on the low-pass filtered echo signal;
calculate amplitudes of a center frequency component and a predetermined number of frequency components surrounding the center frequency component; and
form a feature vector with the calculated amplitudes to form a frequency shift spectrum, wherein the frequency shift spectrum is a feature value of the echo signal, wherein a frequency component corresponding to a frequency of the detection signal is taken as the center frequency component.

8. The electronic device of claim 7, wherein the one or more processors are further configured to:
transmit two detection signals, wherein each of the two detection signals have a frequency greater than a set threshold value, wherein the frequencies of the two detection signals are different from each other.

9. The electronic device of claim 7, wherein the one or more processors are further configured to:
reduce a sampling rate of the low-pass filtered echo signal by performing downsampling on the low-pass filtered echo signal.

10. The electronic device of claim 7, wherein the one or more processors are further configured to:
frame the low-pass filtered echo signal based on a set duration, and multiply the framed echo signal by a window function to window the framed echo signal; and
obtain the frequency components of the echo signal by performing Fourier transform or discrete cosine transform on the windowed echo signal.

11. The electronic device of claim 8, wherein the one or more processors are further configured to:
generate model coefficients of various network layers in a neural network model or a neural network model combination by setting and training the neural network model or the neural network model combination, and generate the decision parameter based on a correlation of the feature value and the model coefficients.

12. The electronic device of claim 8, wherein the one or more processors are further configured to:
set two threshold value $T_1$ and $T_2$, wherein the frequencies of the two detection signals are $f_1$ and $f_2$, and $f_2 > f_1$;
calculate, among the feature values of the echo signal, a ratio $r_1$ of a root-mean-square value or a mean value of amplitudes of the echo signal in a frequency band of $f_{11}$ to $f_{12}$, which is lower than $f_1$, to an amplitude of the echo signal at the frequency $f_1$, and calculate a ratio $r_2$ of a root-mean-square value or a mean value of amplitudes of the echo signal in a frequency band of $f_{21}$ to $f_{22}$, which is higher than $f_2$, to an amplitude of the echo signal at the frequency $f_2$; and
determine that a leaving event occurs in response to $r_1 > T_1$, or determining that an approaching event occurs in response to $r_2 > T_2$.

13. A non-transitory computer-readable storage medium, wherein instructions in the non-transitory computer-readable storage medium, when executed by one or more processors of an electronic device, cause the electronic device to perform acts comprising:
transmitting a detection signal;
receiving an echo signal of the detection signal;

acquiring a feature value of the echo signal; and calculating a decision parameter based on the feature value, and determining, based on the decision parameter, that the electronic device is moving towards or away from a target object, performing frequency shift on the echo signal, and performing low-pass filtering on the frequency-shifted echo signal;

obtaining frequency components of the echo signal by performing frequency domain transform on the low-pass filtered echo signal;

calculating amplitudes of a center frequency component and a predetermined number of frequency components surrounding the center frequency component; and forming a feature vector with the calculated amplitudes to form a frequency shift spectrum, wherein the frequency shift spectrum is a feature value of the echo signal, and wherein a frequency component corresponding to a frequency of the detection signal is taken as the center frequency component.

14. The non-transitory computer-readable storage medium of claim 13, wherein the instructions further cause the electronic device to perform acts comprising:

transmitting two detection signals, wherein each of the two detection signals have a frequency greater than a set threshold value, wherein the frequencies of the two detection signals are different from each other.

15. The non-transitory computer-readable of claim 13, wherein the instructions further cause the electronic device to perform acts comprising:

reducing a sampling rate of the low-pass filtered echo signal by performing downsampling on the low-pass filtered echo signal.

16. The non-transitory computer-readable of claim 13, wherein the instructions further cause the electronic device to perform acts comprising:

framing the low-pass filtered echo signal based on a set duration, and multiplying the framed echo signal by a window function to window the framed echo signal; and obtaining the frequency components of the echo signal by performing Fourier transform or discrete cosine transform on the windowed echo signal.

17. The non-transitory computer-readable of claim 14, wherein the instructions further cause the electronic device to perform acts comprising:

generating model coefficients of various network layers in a neural network model or a neural network model combination by setting and training the neural network model or the neural network model combination, and generating the decision parameter based on a correlation of the feature value and the model coefficients.

* * * * *